United States Patent
Lee et al.

(10) Patent No.: US 10,841,045 B2
(45) Date of Patent: *Nov. 17, 2020

(54) METHOD FOR SKIPPING AN UL TRANSMISSION IN A WIRELESS COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,746

(22) Filed: Jan. 17, 2019

(65) Prior Publication Data

US 2019/0158233 A1 May 23, 2019

Related U.S. Application Data

(63) Continuation of application No. 15/758,323, filed as application No. PCT/KR2016/010515 on Sep. 21, 2016.

(Continued)

(51) Int. Cl.
*H04W 4/00* (2018.01)
*H04L 1/18* (2006.01)
(Continued)

(52) U.S. Cl.
CPC .............. *H04L 1/1877* (2013.01); *H04L 1/18* (2013.01); *H04L 1/1812* (2013.01);
(Continued)

(58) Field of Classification Search
CPC ........ H04L 1/18; H04L 1/1822; H04L 1/1887; H04L 1/864; H04L 1/1877
See application file for complete search history.

(56) References Cited

U.S. PATENT DOCUMENTS

| 2009/0086657 | A1 | 4/2009 | Alpert et al. |
| 2011/0305197 | A1* | 12/2011 | Park .................. H04L 1/1812 370/328 |
| 2011/0310833 | A1 | 12/2011 | Lee et al. |
| 2013/0094468 | A1* | 4/2013 | Ko .................. H04B 7/0404 370/329 |

(Continued)

OTHER PUBLICATIONS

PCT International Application No. PCT/KR2016/010515, Notification of Transmittal of the International Search Report and the Written Opinion of the International Searching Authority, or Declaration dated Dec. 16, 2016, 10 pages.

(Continued)

*Primary Examiner* — Bo Hui A Zhu
(74) *Attorney, Agent, or Firm* — Lee Hong Degerman Kang Waimey

(57) ABSTRACT

The present invention relates to a wireless communication system. More specifically, the present invention relates to a method and a device for skipping an UL transmission in a wireless system, the method comprising: receiving a RRC signaling configuring that the UE skips an UL transmission if there is no data available for transmission, receiving an UL grant for new transmission for a HARQ process, and discarding an old MAC PDU in a HARQ buffer of the HARQ process without storing any new MAC PDU in the HARQ buffer, if there is no data available for transmission.

8 Claims, 7 Drawing Sheets

Related U.S. Application Data

(60) Provisional application No. 62/221,632, filed on Sep. 22, 2015.

(51) Int. Cl.
*H04W 72/12* (2009.01)
*H04W 76/27* (2018.01)
*H04W 72/04* (2009.01)

(52) U.S. Cl.
CPC .......... *H04L 1/1822* (2013.01); *H04L 1/1864* (2013.01); *H04L 1/1887* (2013.01); *H04W 72/1268* (2013.01); *H04W 76/27* (2018.02); *H04W 72/042* (2013.01)

(56) References Cited

U.S. PATENT DOCUMENTS

| | | |
|---|---|---|
| 2014/0036885 A1 | 2/2014 | Moberg et al. |
| 2015/0043352 A1 | 2/2015 | Jang et al. |
| 2018/0270026 A1 | 9/2018 | Lee et al. |

OTHER PUBLICATIONS

Intel, "Protocol impact of fast uplink access solution for latency reduction", 3GPP TSG RAN WG2 Meeting #91, R2-153294, Aug. 2015, 3 pages.

Samsung, "Skipping uplink transmission with no data to transmit", 3GPP TSG RAN WG2 Meeting #91, R2-153332, Aug. 2015, 2 pages.

U.S. Appl. No. 15/758,323, Office Action dated Mar. 22, 2019, 7 pages.

\* cited by examiner

[FIG. 1]
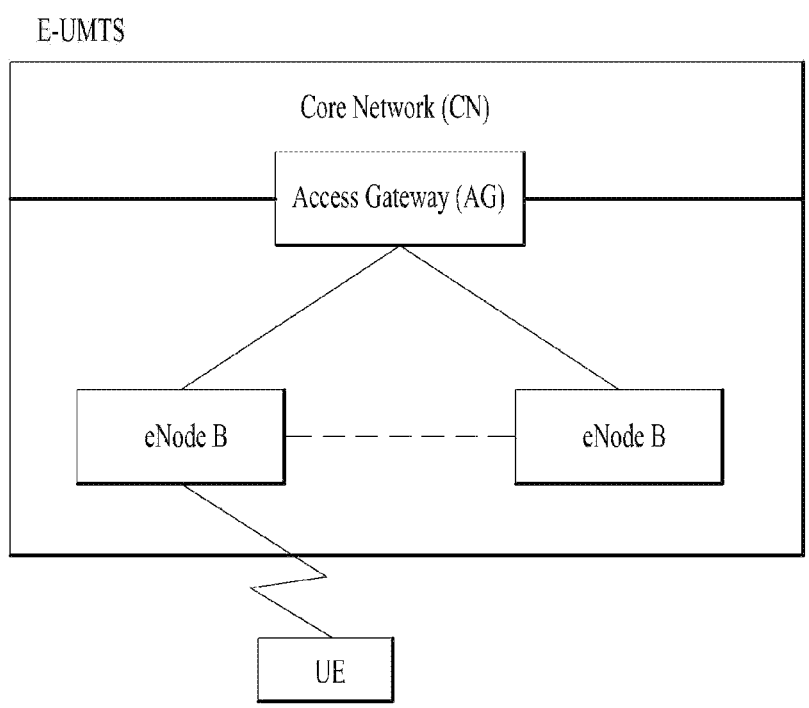

【FIG. 2A】
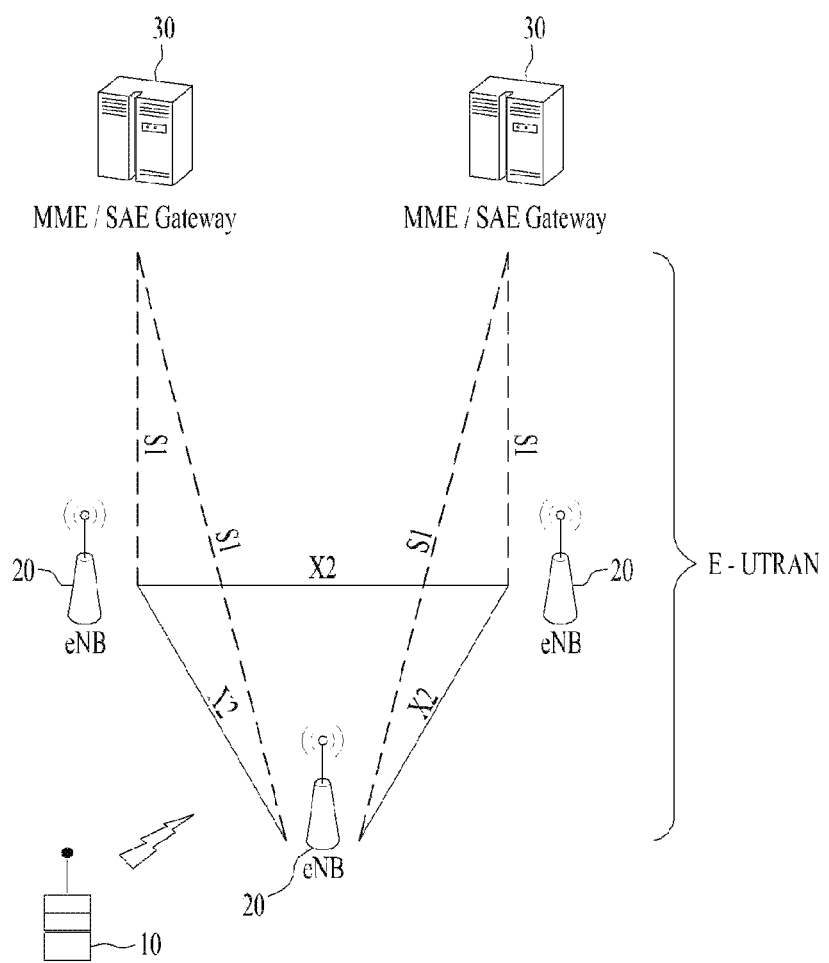

[FIG. 2B]
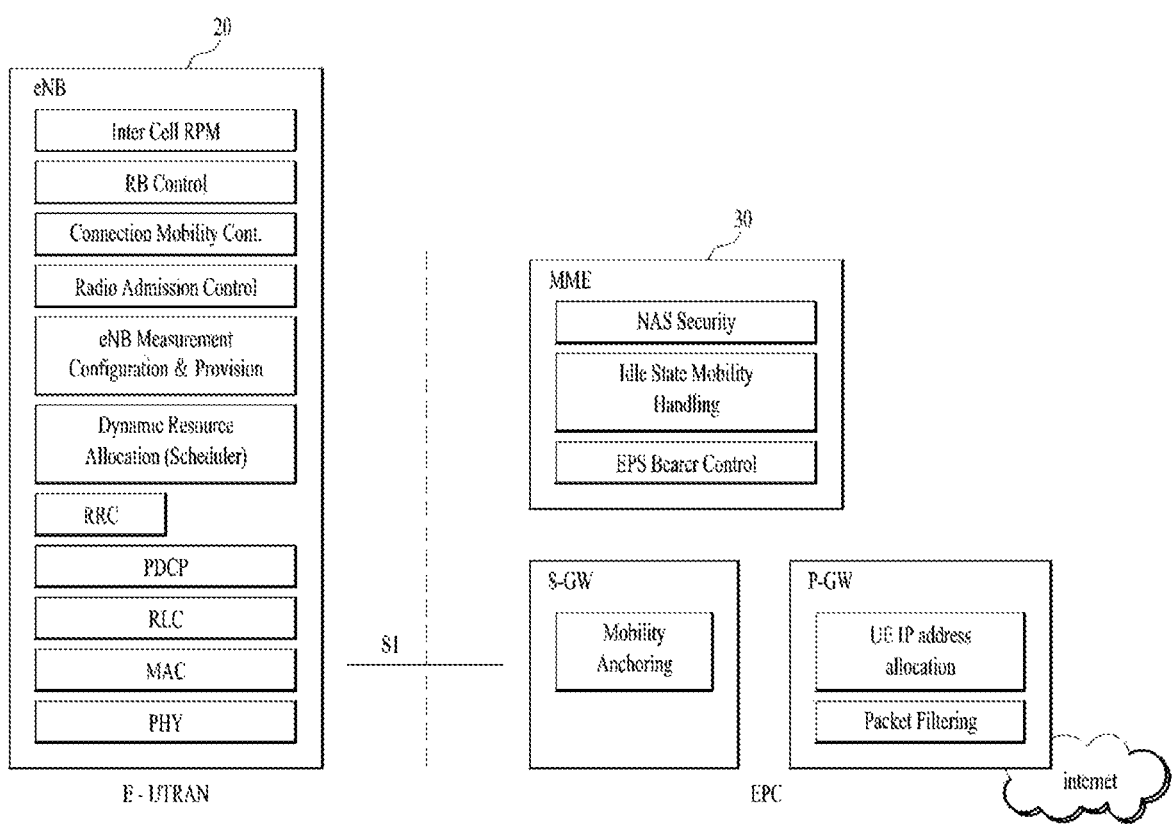

【FIG. 3】
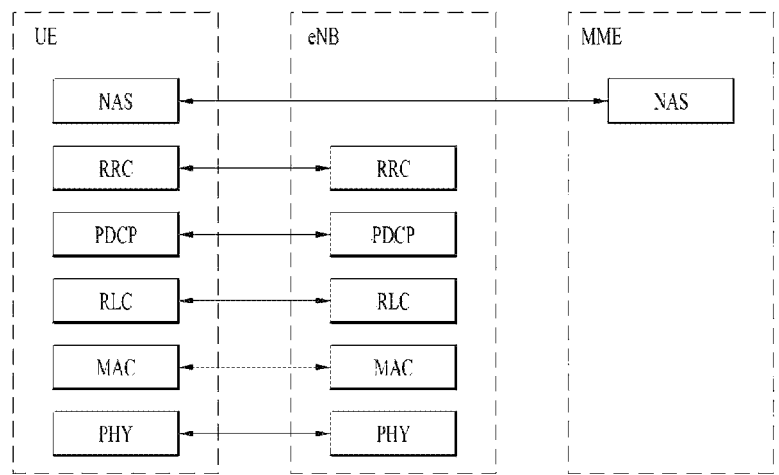
(a) Control-Plane Protocol Stack
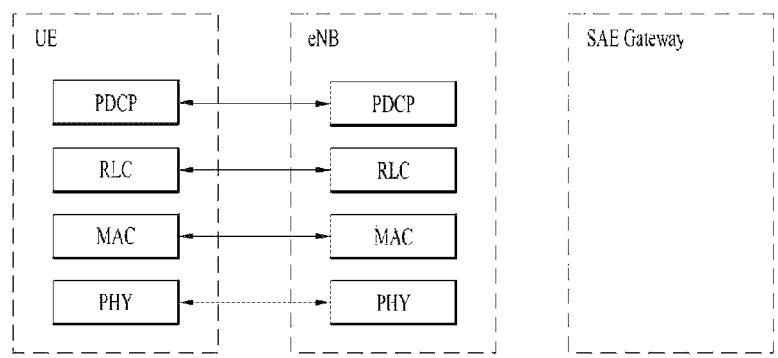
(b) User-Plane Protocol Stack 【FIG. 4】
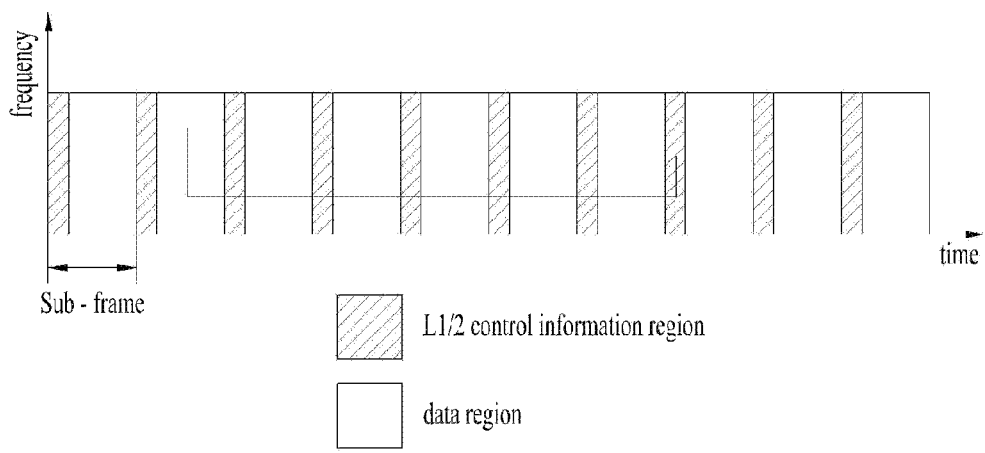
【FIG. 5】
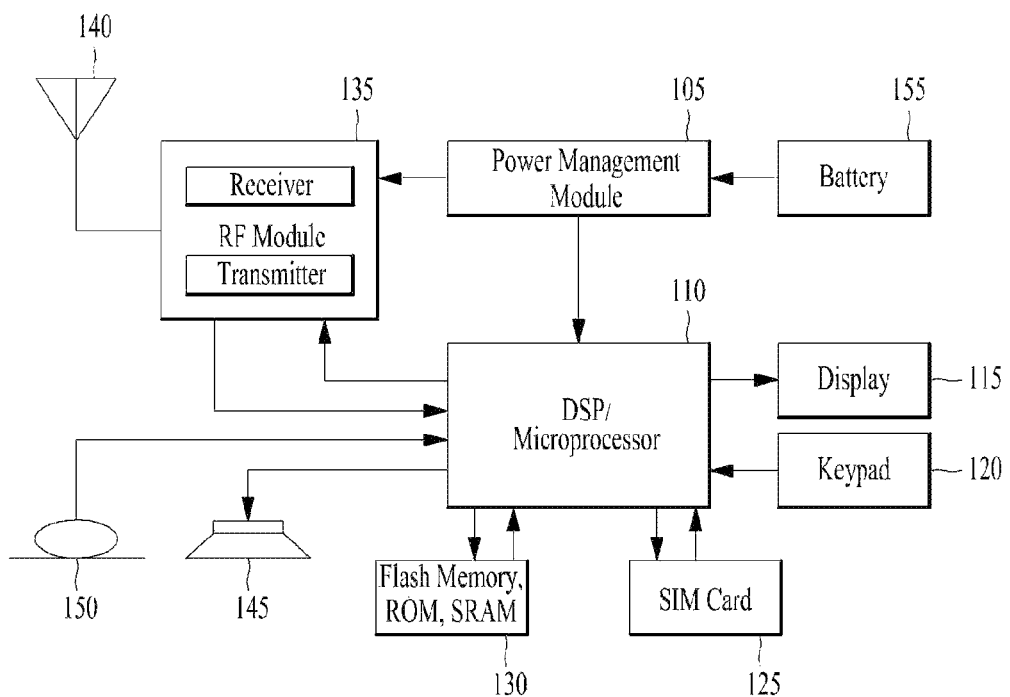

[FIG. 6]
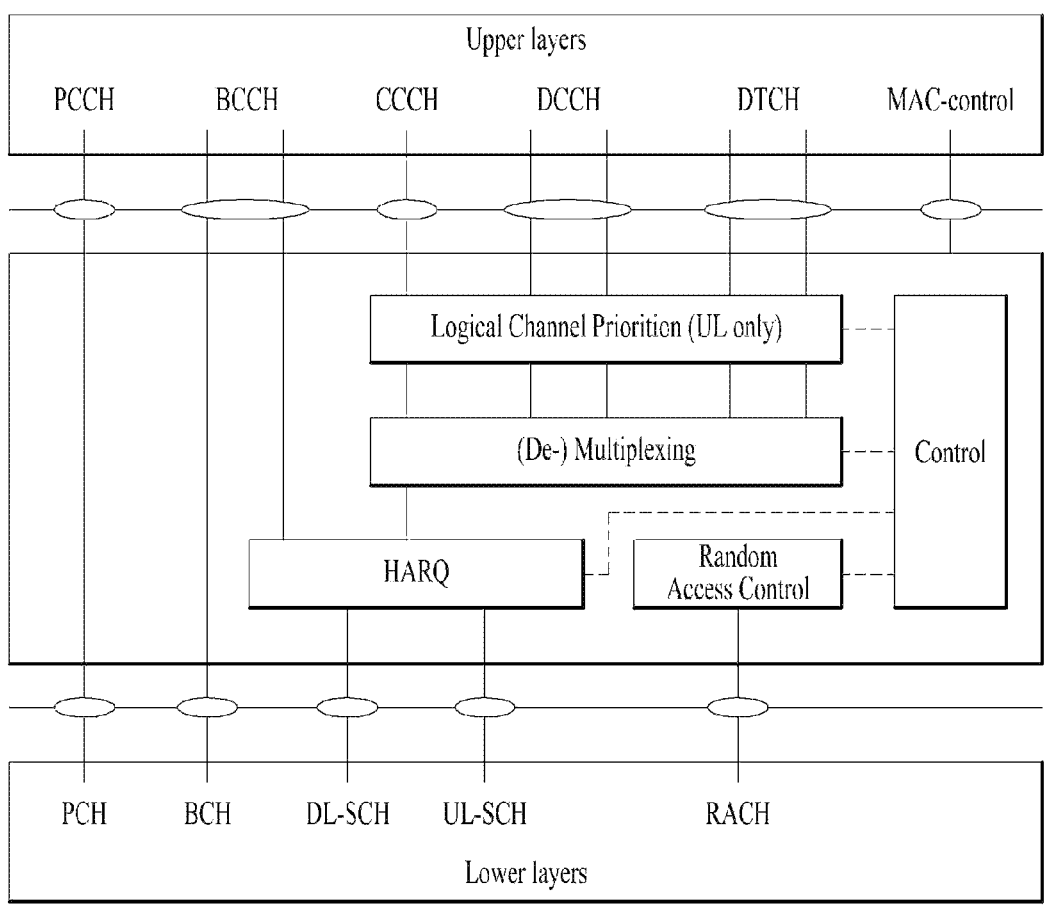

[FIG. 7]
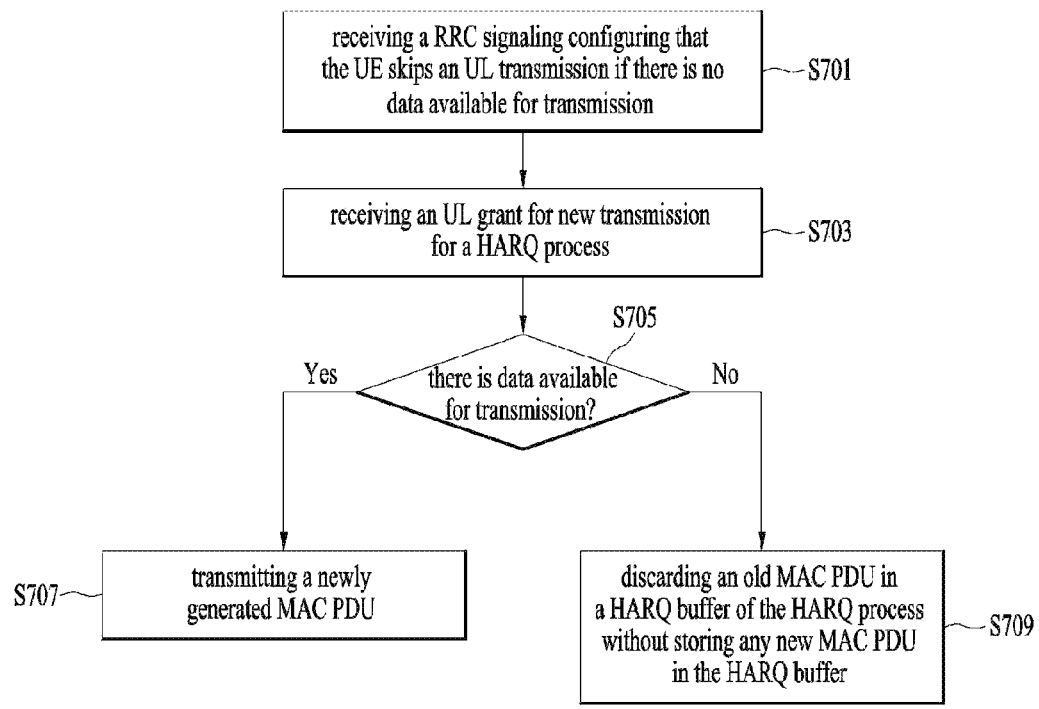

METHOD FOR SKIPPING AN UL TRANSMISSION IN A WIRELESS COMMUNICATION SYSTEM AND DEVICE THEREFOR

CROSS-REFERENCE TO RELATED APPLICATIONS

This application is a continuation of U.S. patent application Ser. No. 15/758,323, filed on Mar. 7, 2018, currently pending, which is the National Stage filing under 35 U.S.C. 371 of International Application No. PCT/KR2016/010515, filed on Sep. 21, 2016, which claims the benefit of U.S. Provisional Application No. 62/221,632, filed on Sep. 22, 2015, the contents of which are all hereby incorporated by reference herein in their entirety.

TECHNICAL FIELD

The present invention relates to a wireless communication system and, more particularly, to a method for skipping an UL transmission in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

*7 An object of the present invention devised to solve the problem lies in a method and device for a method for skipping an UL transmission in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

It is invented that a UE can flush a hybrid automatic repeat and request (HARQ) buffer and does not fill the HARQ buffer with padding-only medium access control protocol data unit (MAC PDU), if the UE receives a UL grant for new transmission while there is no data available for transmission.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for MAC structure overview in a UE side; and

FIG. 7 is a diagram of a method for skipping an UL transmission in a wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI, the MAC entity may consider the NDI to have been toggled for the corresponding HARQ process regardless of the value of the NDI, and deliver the uplink grant and the associated HARQ information to the HARQ entity for this TTI if: i) an uplink grant for this TTI and this Serving Cell has been received on the PDCCH for the MAC entity's C-RNTI or Temporary C-RNTI; or ii) an uplink grant for this TTI has been received in a Random Access Response, and if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant.

Else, if this Serving Cell is the SpCell and if an uplink grant for this TTI has been received for the SpCell on the PDCCH of the SpCell for the MAC entity's Semi-Persistent Scheduling C-RNTI, the MAC entity may consider the NDI for the corresponding HARQ process not to have been toggled, and deliver the uplink grant and the associated HARQ information to the HARQ entity for this TTI, if the NDI in the received HARQ information is 1. Else if the NDI in the received HARQ information is 0, the MAC entity may clear the configured uplink grant if PDCCH contents indicate SPS release. Or, the MAC entity may store the uplink grant and the associated HARQ information as configured uplink grant, initialise (if not active) or re-initialise (if already active) the configured uplink grant to start in this TTI and to recur, consider the NDI bit for the corresponding HARQ process to have been toggled, and deliver the configured uplink grant and the associated HARQ information to the HARQ entity for this TTI, if PDCCH contents do not indicate SPS release.

Else, if this Serving Cell is the SpCell and an uplink grant for this TTI has been configured for the SpCell, the MAC entity may consider the NDI bit for the corresponding HARQ process to have been toggled, and deliver the configured uplink grant, and the associated HARQ information to the HARQ entity for this TTI.

The period of configured uplink grants is expressed in TTIs. If the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI. When a configured uplink grant is indicated during a measurement gap and indicates an UL-SCH transmission during a measurement gap, the MAC entity processes the grant but does not transmit on UL-SCH.

Meanwhile, there is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

When the physical layer is configured for uplink spatial multiplexing, there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle. TTI bundling is not supported when the MAC entity is configured with one or more SCells with configured uplink.

TTI bundling is not supported for RN communication with the E-UTRAN in combination with an RN subframe configuration. For transmission of Msg3 during Random Access, TTI bundling does not apply.

For each TTI, the HARQ entity shall identify the HARQ process(es) associated with this TTI and for each identified HARQ process.

If an uplink grant has been indicated for this process and this TTI, the HARQ entity shall obtain the MAC PDU to transmit from the "Multiplexing and assembly" entity, deliver the MAC PDU and the uplink grant and the HARQ information to the identified HARQ process, and instruct the identified HARQ process to trigger a new transmission if: i) the received grant was not addressed to a Temporary C-RNTI on PDCCH and if the NDI provided in the associated HARQ information has been toggled compared to the value in the previous transmission of this HARQ process; or ii) the uplink grant was received on PDCCH for the C-RNTI and the HARQ buffer of the identified process is empty; or iii) there is no MAC PDU in the Msg3 buffer and the uplink grant was received in a Random Access Response. If there is a MAC PDU in the Msg3 buffer and the uplink grant was received in a Random Access Response, the HARQ entity shall obtain the MAC PDU to transmit from the Msg3 buffer. Else, the MAC entity shall deliver the uplink grant and the HARQ information (redundancy version) to the identified HARQ process, and instruct the identified HARQ process to generate an adaptive retransmission.

Else, if the HARQ buffer of this HARQ process is not empty, the HARQ entity shall instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall: i) set CURRENT_TX_NB to 0; ii) set CURRENT_IRV to 0; iii) store the MAC PDU in the associated HARQ buffer; iv) store the uplink grant received from the HARQ entity; v) set HARQ_FEEDBACK to NACK; and vi) generate a transmission as described below.

If the HARQ entity requests a retransmission, the HARQ process shall: i) increment CURRENT_TX_NB by 1; ii) store the uplink grant received from the HARQ entity, set CURRENT_IRV to the index corresponding to the redundancy version value provided in the HARQ information, set HARQ_FEEDBACK to NACK, generate a transmission as described below, if the HARQ entity requests an adaptive retransmission; iii) generate a transmission as described below else if the HARQ entity requests a non-adaptive retransmission and if HARQ_FEEDBACK=NACK.

It is noted that i) When receiving a HARQ ACK alone, the MAC entity keeps the data in the HARQ buffer; and ii) When no UL-SCH transmission can be made due to the occurrence of a measurement gap, no HARQ feedback can be received and a non-adaptive retransmission follows.

To generate a transmission, if the MAC PDU was obtained from the Msg3 buffer or if there is no measurement gap at the time of the transmission and, in case of retransmission, the retransmission does not collide with a transmission for a MAC PDU obtained from the Msg3 buffer in this TTI, the HARQ process shall instruct the physical layer to generate a transmission according to the stored uplink grant with the redundancy version corresponding to the CURRENT_IRV value and increment CURRENT_IRV by 1. If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB=maximum number of transmissions−1.

In summary, the current UL HARQ procedure is described in the below: i) When the UE receives an UL grant, the UE delivers the UL grant and HARQ information to the HARQ entity, ii) When HARQ entity receives the UL grant, the HARQ entity checks whether it's a UL grant for new transmission or retransmission based on HARQ information, NDI, etc, iii) If the UL grant is for new transmission, the HARQ entity obtains a MAC PDU from a Multiplexing and assembly entity, iv) The HARQ entity delivers the obtained MAC PDU and UL grant to the HARQ process, and tells whether it's a new transmission or retransmission, v) When the HARQ process receives the UL grant and MAC PDU, the HARQ process stores the MAC PDU and performs either new transmission or retransmission as indicated by HARQ entity.

Up to Rel-12, the UE flushes the HARQ buffer only when CURRENT_TX_NB (which indicates the number of transmissions that have taken place for the MAC PDU currently in the buffer, as discussed above) is reached. While the HARQ buffer is not empty, if ACK is received for the MAC PDU, the UE doesn't perform non-adaptive retransmission of the stored MAC PDU while keeping the MAC PDU in the HARQ buffer. Or, while the HARQ buffer is not empty, if the HARQ entity requests a new transmission, the UE stores the new MAC PDU in the HARQ buffer and instruct PHY layer to generate a transmission of the MAC PDU stored in the HARQ buffer. This can be done by flushing HARQ buffer, that is, remove old MAC PDU, and store the new MAC PDU (but it's totally up to UE implementation).

Meanwhile, in Rel-13, in scope of Latency Reduction, it is allowed for the UE to skip UL grant if there is no data available for transmission. In legacy operation, the UE sends a MAC PDU containing a MAC CE for padding BSR and optionally padding bits in response to an allocated UL dynamic or configured grant even if no data is available for transmission in the UE buffer and no other regular MAC CE is needed to be sent. With frequent UL grants, allowing skipping UL grants may decrease UL interference and improve UE battery efficiency. Thus, it is allowed for UE to skip (most) dynamic and configured uplink grants if no data is available for transmission (The UE will continue to send one or more regular MAC CE(s), if any. That is, here, the data refers the data in a PDCP entity and a RLC entity but excluding e.g., MAC Control Elements other than Padding BSR). The eNB may enable skipping UL grants by RRC dedicated signalling.

As per the current UL HARQ procedure, the problem is described as below.

Assume that there is a MAC PDU stored in the HARQ buffer, for which ACK is received. More specifically, a UE may transmit the MAC PDU to an eNB, and the eNB may transmit ACK for the MAC PDU to the UE. After that, the UE receives an UL grant for a new transmission while there is no data available for transmission in RLC and PDCP entities. Accordingly, no new MAC PDU is obtained from higher layers. The old MAC PDU (i.e., the MAC PDU for which ACK is received) already stored in the HARQ buffer will not be replaced by any (This is because there is no new MAC PDU for replacing the old MAC PDU). Thus, the old MAC PDU is kept in the HARQ buffer. After that, the UE MAC instructs to UE PHY to generate a new transmission for the old MAC PDU stored in the HARQ buffer, which the eNB already successfully received.

As seen in the above, there should be a method to skip uplink transmission if there is no data available for transmission by considering the case that there is a MAC PDU already stored in the HARQ buffer.

Therefore, in the present invention, for a UE configured to skip uplink transmission if there is no data available for transmission and if the UE receives a UL grant for new transmission, the UE empties the HARQ buffer if there is no data available for transmission. In other words, if the UE receives a UL grant for new transmission while there is no data available for transmission, the UE flushes the HARQ buffer and does not fill the HARQ buffer with padding-only MAC PDU.

More specifically, a UE is configured by an eNB that the UE skips UL transmission if there is no data available for transmission via RRC signaling. The UE can be configured to skip UL transmission for a certain time period. While the UE is configured to skip UL transmission, if the UE receives an UL grant for a new transmission, the UE checks whether there is data available for transmission or not.

If there is data available for transmission, the UE i) generates a MAC PDU, ii) stores the generated MAC PDU in an associated HARQ buffer (i.e., the UE replaces the MAC PDU already stored in the HARQ buffer by the newly generated MAC PDU), and iii) performs a transmission of the newly generated MAC PDU.

Else, if there is no data available for transmission, the UE i) doesn't generate a MAC PDU, ii) flushes the associated HARQ buffer (i.e., the UE discards a MAC PDU stored in the associated HARQ buffer), iii) doesn't store any MAC PDU in the associated HARQ buffer, and iv) doesn't perform a transmission.

Here, the associated HARQ buffer refers a HARQ buffer of a HARQ process associated with a TTI indicated by the received UL grant.

More specific example of the invention is described blow.

When a UE receives an UL grant, the UE delivers the UL grant and HARQ information to the HARQ entity. When the HARQ entity receives the UL grant, the HARQ entity checks whether it's a UL grant for new transmission or a UL grant for retransmission based on the delivered HARQ information (e.g., NDI, etc.).

If the UL grant is for new transmission, and if the UE is configured to skip uplink transmission and if there is no data available for transmission, i) The HARQ entity doesn't obtain a MAC PDU, and doesn't deliver the UL grant to a HARQ process associated with the UL grant; and ii) The HARQ process flushes the associated HARQ buffer, doesn't store any MAC PDU in the associated HARQ buffer, and doesn't perform a transmission.

Else, i) The HARQ entity obtains a MAC PDU from a Multiplexing and assembly entity, and delivers the obtained MAC PDU and the UL grant to a HARQ process associated with the UL grant, and tells whether it's a new transmission or retransmission to the HARQ process; and ii) When the HARQ process receives the UL grant and the MAC PDU, the HARQ process stores the MAC PDU and performs either new transmission or retransmission as indicated by the HARQ entity.

An exemplary flow chart will be introduced with reference to FIG. 7.

FIG. 7 is a diagram of a method for skipping an UL transmission in a wireless communication system according to embodiments of the present invention.

In descriptions with reference to FIG. 7, it is assumed that a UE is configured by an eNB that the UE skips UL transmission if there is no data available for transmission via RRC signaling. The UE can be configured to skip UL transmission for a certain time period.

Referring to FIG. 7, a UE receives a radio resource control (RRC) signaling configuring that the UE skips an uplink (UL) transmission if there is no data available for transmission (S701). While the UE is configured to skip UL transmission, the UE receives an UL grant for new transmission for a hybrid automatic repeat and request (HARQ) process (S703). In some embodiments, before the step S703, the UE may check whether the UL grant is for new transmission or retransmission. In the present embodiment, the UL grant is for new transmission.

When the UL grant is for new transmission, the UE may check whether there is data available for transmission or not (S705).

If there is data available for transmission, the UE may transmit a newly generated MAC PDU (S707). More specifically, in this case, the UE stores a new MAC PDU in the HARQ buffer after the old MAC PDU is discarded in the HARQ buffer, and transmits the new MAC PDU by using the UL grant for new transmission.

If there is no data available for transmission, the UE discards an old MAC PDU in a HARQ buffer of the HARQ process without storing any new MAC PDU in the HARQ buffer (S709). In this case, the UE doesn't perform an UL transmission by using the UL grant for new transmission.

In summary, according to the present invention, the UE can flush a HARQ buffer and does not fill the HARQ buffer with padding-only MAC PDU, if the UE receives a UL grant for new transmission while there is no data available for transmission.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for operating, by a user equipment (UE), in a wireless communication system, the method comprising:
   receiving configuration related to a skip of an uplink (UL) transmission;
   receiving, from a base station, an uplink (UL) grant for the UL transmission for a hybrid automatic repeat and request (HARQ) process; and
   performing a specific operation based on the configuration,
   wherein the specific operation comprises:
      based on a Medium Access Control (MAC) protocol data unit (PDU) for the UL grant being not obtained, not delivering the UL grant to the HARQ process and flushing, for skipping the UL transmission on the UL grant, a HARQ buffer related to the HARQ process; and
      based on the MAC PDU for the UL grant being obtained, delivering the UL grant to the HARQ process and transmitting the MAC PDU on the UL grant.

2. The method of claim 1, wherein the UL grant is an UL grant for a new transmission.

3. The method of claim 1, wherein the configuration is received via a radio resource control (RRC) message.

4. The method of claim 1, further comprising:
   determining that data is not available for transmission.

5. A user equipment (UE) configured to operate in a wireless communication system, the UE comprising:
   a transceiver; and
   a processor operatively connected to the transceiver and configured to:
   control the transceiver to receive configuration related to a skip of an uplink (UL) transmission;
   control the transceiver to receive, from a base station, an uplink (UL) grant for the UL transmission for a hybrid automatic repeat and request (HARQ) process; and
   perform a specific operation based on the configuration,
   wherein the specific operation comprises:
      based on a Medium Access Control (MAC) protocol data unit (PDU) for the UL grant being not obtained, not delivering the UL grant to the HARQ process and flushing, for skipping the UL transmission on the UL grant, a HARQ buffer related to the HARQ process, and
      based on the MAC PDU for the UL grant being obtained, delivering the UL grant to the HARQ process and controlling the transceiver to transmit the MAC PDU on the UL grant based on the configuration set not to skip the UL transmission.

6. The UE of claim 5, wherein the UL grant is an UL grant for a new transmission.

7. The UE of claim 5, wherein the configuration is received via a radio resource control (RRC) message.

8. The UE of claim 5, wherein the processor is further configured to determine that data is not available for transmission.

* * * * *